US006813391B1

(12) United States Patent
Uyttendaele et al.

(10) Patent No.: US 6,813,391 B1
(45) Date of Patent: Nov. 2, 2004

(54) SYSTEM AND METHOD FOR EXPOSURE COMPENSATION

(75) Inventors: Matthew T. Uyttendaele, Seattle, WA (US); Richard S. Szeliski, Bellevue, WA (US)

(73) Assignee: Microsoft Corp., Redmond, WA (US)

( * ) Notice: Subject to any disclaimer, the term of this patent is extended or adjusted under 35 U.S.C. 154(b) by 992 days.

(21) Appl. No.: 09/611,645

(22) Filed: Jul. 7, 2000

(51) Int. Cl.$^7$ .............................. G06K 9/36; G09G 5/00; H04N 7/00
(52) U.S. Cl. ......................... 382/284; 345/629; 348/36
(58) Field of Search ................................ 382/254, 266, 382/267, 268, 269, 274, 275, 284, 295, 298, 294, 299, 296, 289, 312; 345/629, 630, 651, 589; 348/36, 42

(56) References Cited

U.S. PATENT DOCUMENTS

| 5,982,951 | A | * | 11/1999 | Katayama et al. .......... 382/284 |
| 6,075,905 | A | * | 6/2000 | Herman, deceased et al. ............ 382/284 |
| 6,088,082 | A | * | 7/2000 | Yonekawa ................... 355/53 |
| 6,249,616 | B1 | * | 6/2001 | Hashimoto ................. 382/284 |
| 6,393,162 | B1 | * | 5/2002 | Higurashi ................... 382/284 |
| 6,493,558 | B1 | * | 12/2002 | Bernhart et al. ............ 455/466 |

OTHER PUBLICATIONS

"Panoramic Image Mosaics", Heung–Yeung Shum, Richard Szeliski, IEEE Computer Graphics and Applications, Mar. 1996.

Catadioptric Omnidirectional Camera, Shree Nayar, Proc. Of IEEE Conference on Computer Vision and Pattern Recognition, Puerto Rico, Jun. 1997.

* cited by examiner

Primary Examiner—Kanji Patel
(74) Attorney, Agent, or Firm—Lyon & Harr, LLP; Katrina A. Lyon

(57) ABSTRACT

A system and method for adjusting exposure in a mosaiced or stitched image. A stitched composite image is typically represented by a set of images and a set of associated transformations. Each transformation corresponds to one image in the input image sequence and represents the mapping between image pixels in each image and a three-dimensional coordinate system. Every triplet of images in the mosaiced image, having a first, center and third image, is input into the system and method according to the present invention. Before exposure adjustment can be performed, the regions of overlap between the input images in the mosaiced image are calculated. Once the areas of overlap associated with the first and third images are found, the areas of overlap associated with these images are warped to the coordinate frame of the center image. This allows the corresponding pixel locations in the first and center images, and the corresponding pixel location in the third and center images to be determined for the overlapping areas. Additionally, the luminance of each pixel in these areas is identified. The exposure correction factors for each overlapping area are then calculated. Once the exposure correction factors for each overlapping area are calculated, the luminance of all pixels in the center image are adjusted using these factors to yield a mosaiced image that appears to be consistent in exposure. This process is repeated until all sets of triplets have been considered.

19 Claims, 8 Drawing Sheets

SYSTEM AND METHOD FOR EXPOSURE COMPENSATION

BACKGROUND OF THE INVENTION

1. Technical Field

This invention is directed towards a system and method for image processing in general, and more particularly, to a system and process for improving the uniformity in exposure for a composite image generated from a set of digital images depicting different but overlapping portions of a scene captured at different exposure levels.

2. Background Art

An image mosaic or panorama can be generated by aligning and "stitching" input images that are acquired from a single camera. When acquiring the input images, this camera is adjusted to have as near as possible the same settings, including exposure, for all images acquired. Nevertheless, there are still sometimes differences in exposure between images because lighting conditions may change over the course of time and adjustments to exposure settings may be necessary when capturing images from different angles or perspectives. Furthermore, even when all other conditions remain constant, the exposure setting can be inadvertently changed between pictures. As a result, when the input images are stitched together, the images can exhibit differences in exposure levels, making the edges or boundaries of the stitching in the composite image obvious to the viewer.

The problem of exposure differences between input images in a composite, mosaiced image is compounded when multiple cameras are used to acquire the input images. Such is the case when multiple cameras are used to generate a panoramic video. Essentially, the creation of a panoramic video entails acquiring multiple videos depicting a full 360 degree view of the surrounding scene. A camera rig, consisting of multiple cameras disposed in a back to back fashion, is sometimes employed for the purpose of capturing these videos. There is great difficulty in adjusting the settings of the multiple cameras used in this configuration to have exactly the same exposure settings. As a result, the stitched or mosaiced composite image will often exhibit distinct "edges" where the different input images overlap due to the different exposures of these images.

SUMMARY

The present invention overcomes the aforementioned limitations by a system and method that adjusts the exposure of a mosaiced image so that the final image will exhibit a similar exposure level for all image regions.

As alluded to in the previous paragraphs, when creating image mosaics, a set of input images is stitched together. The stitched composite image is typically represented by these images and a set of associated transformations. Each transformation corresponds to one image in the input image sequence and represents the mapping between image pixels in each image and the viewing directions in the world (i.e., a three-dimensional coordinate system). Such a stitched image could be a composite of numerous images. The system and method according to the present invention adjusts the exposure of the entire mosaiced image by considering three consecutive input images (a triplet) at a time. Each triplet is typically characterized by a first, center and third image. The triplet of images is input into the system and method according to the present invention. The regions of overlap between the input images in the mosaiced image are then calculated. Determining these regions of overlap normally poses no problem since the coordinates of all pixels in each input image are known relative to the same coordinate system as a result of the mosaicing process.

Once the areas of overlap associated with the first and third images are found, the areas are warped to the coordinate frame of the center image. This allows the corresponding pixel locations in the first and center images, and the corresponding pixel locations in the third and center images to be determined for the overlapping areas. Additionally, the luminance of each pixel in these areas is identified.

The required exposure correction factors for each overlapping area are then calculated. To calculate the exposure correction factors associated with the first and center images, for each pixel location associated with the overlap area between the first and the center image, the average luminance value of the correspondingly located pixels in these two images is calculated. This average luminance of the correspondingly located pixels is fit to a first gain factor multiplied by the luminance of the center image pixel plus a first bias factor. A value for the first gain factor and the first bias factor is then calculated by "solving" the set of equations just produced. Similarly, to calculate the exposure correction factors associated with the center and third images, for each pixel location associated with the overlap area between the third and center image, the average luminance value of correspondingly located pixels is calculated. This average luminance is fit to a second gain factor multiplied by the luminance of the center image pixel plus a second bias factor. A value for the second gain factor and the second bias factor is then calculated by "solving" the new equation set. Preferably, the method of solving for the values for the first and second gain and bias factors involves the use of a least squares fit approach.

Once the exposure correction factors associated with each overlapping area are calculated, the luminances of all pixels in the center image are adjusted using these factors. For each column of pixels, if the triplet of images are aligned horizontally, or for each row of pixels in the center image, if the images are aligned vertically, separate gain and bias factors are calculated by linearly ramping from the first gain factor to the second gain factor and from the first bias factor to the second bias factor. Thus, there is a unique bias and gain factor assigned to each column or row. The luminance of each pixel of the column or row is multiplied by the gain factor associated with that column or row. This resulting product is added to the bias factor associated with that column or row to compute an adjusted luminance for the pixel under consideration. The adjusted luminance computed for each pixel is then assigned to that pixel to arrive at the corrected exposure.

This process of inputting a set of image triplets, finding the overlapping regions, warping the areas to the coordinate frame of the center image, identifying corresponding pixels and their luminance values, calculating the required exposure correction factors, and adjusting the luminances of the pixels in the center image is repeated until all triplets of the mosaiced image have been considered.

It is also possible to further improve the uniformity of the mosaiced image exposure by blending the transitions between overlapping and non-overlapping input image regions to hide the edges of the component images. Preferably this blending can be accomplished using any conventional feathering algorithm such as that described in R. Szeliski. Video Mosaics for Virtual Environments, IEEE Graphics and Applications, 16(2): 22–30, March 1996. Using this feathering algorithm the luminance value of the pixels in each image are weighted proportionally to their distance to the edge of the overlapping region. This is done by using a weighted average with pixels near the center of each image contributing more to the final composite. The weighting function is a simple bilinear function that goes to zero at both edges of the image.

Furthermore, the system and process according to the present invention could be adapted to a full 2D context rather than just pure horizontal or vertical overlapped images. In other words, the present exposure compensation approach could be extended to mosaiced images where a particular component image could have adjacent overlapping images in any 2D direction. There could even be more than just two adjacent images involved. For mosaiced images in which multiple frames overlap, gain and bias values would be fit to the average luminances of the corresponding pixels in the overlap regions just as with purely horizontal or vertical overlapping image scenarios. However, these values would then be fit to a smoothly varying function to compute the gain and bias in other regions of the compensated image. The values could be fit to a plane. In this case the gain and bias factors would vary in two directions. Other smooth interpolation schemes, such as splines, could also be used.

DESCRIPTION OF THE DRAWINGS

The specific features, aspects, and advantages of the present invention will become better understood with regard to the following description, appended claims and accompanying drawings where:

DETAILED DESCRIPTION OF THE PREFERRED EMBODIMENTS

In the following description of the preferred embodiments of the present invention, reference is made to the accompanying drawings, which form a part hereof, and which is shown by way of illustration of specific embodiments in which the invention may be practiced. It is understood that other embodiments may be utilized and structural changes may be made without departing from the scope of the present invention.

Exemplary Operating Environment

Figure 1:
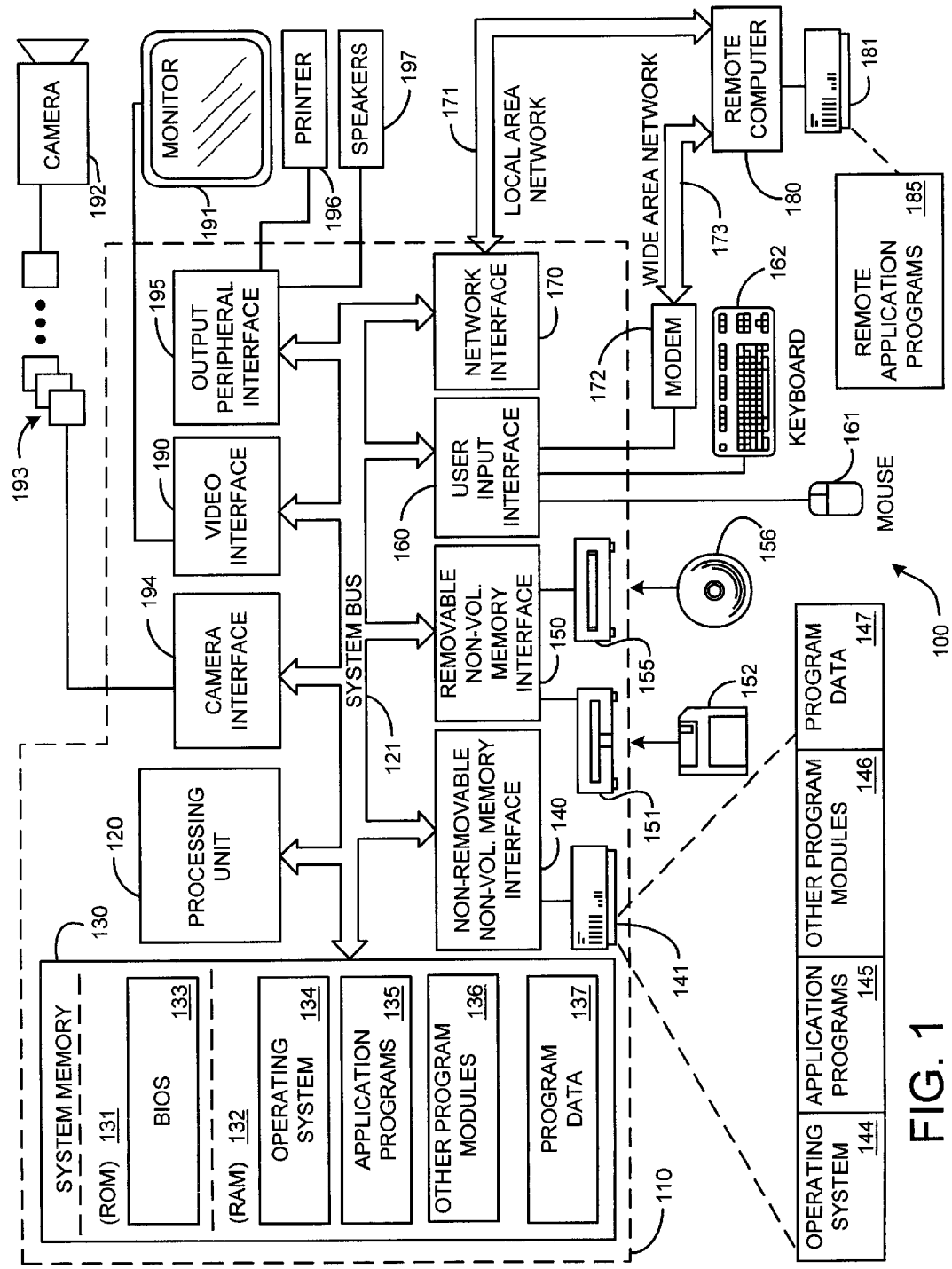
FIG. 1 is a diagram depicting a general purpose computing device constituting an exemplary system for implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by 110 computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

Exposure Compensation

Figure 2:
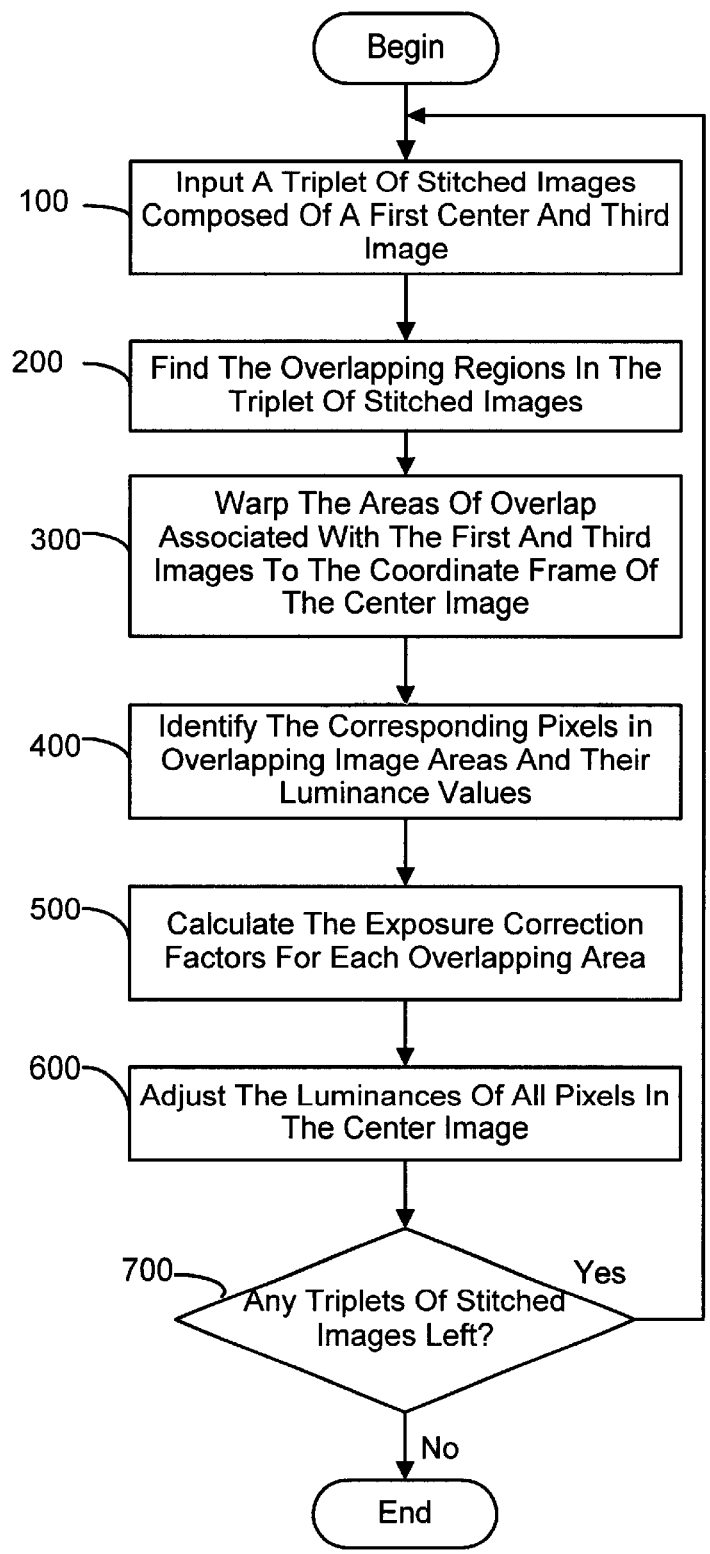
FIG. 2 is a flow diagram of a method for adjusting exposure in a stitched image.

Referring to FIG. 2, when creating image mosaics, a set of input images are stitched together. The stitched composite image is typically represented by these images and a set of associated transformations. Each transformation corresponds to one image in the input image sequence and represents the mapping between image pixels in each image and the viewing directions in the world (i.e., a three-dimensional coordinate system). Such a stitched image could be a composite of hundreds of images. The system and method according to the present invention adjusts the exposure of the entire mosaiced image by considering three consecutive images (a triplet) at a time. Each triplet of images is characterized by a first, center and third image. A triplet of images is input into the system and method according to the present invention, as shown in process action 100.

As shown in process action 200 of FIG. 2, the regions of overlap between the input images in the mosaiced image are then identified. This information is already available since regions of image overlap are typically determined and utilized by the stitching algorithm in the normal image stitching process. Specifically, the regions of overlap can easily be determined because the coordinates of all pixels in each input image are known relative to the same coordinate system.

Once the areas of overlap are identified, the areas of overlap associated with the first and third images are warped to the coordinates of the center image (process action 300). This allows the corresponding pixel locations in the first and center images, and the corresponding pixel locations in the third and center images to be readily identified as well as their respective luminances (process action 400). The exposure correction factors for each overlapping area are then calculated, as indicated by process action 500. Once the exposure correction factors associated with each overlapping area are calculated, the luminances of all pixels in the center image are adjusted using these factors (process action 600).

Finally, the foregoing process of inputting a set of image triplets, finding the overlapping regions, warping the areas to coordinates of the center image, identifying corresponding pixels and their luminance values, calculating the required exposure correction factors, and adjusting the luminances of the pixels in the center image is repeated until all sets of triplets of any stitched images have been adjusted, as indicated by process action 700.

Figure 3:
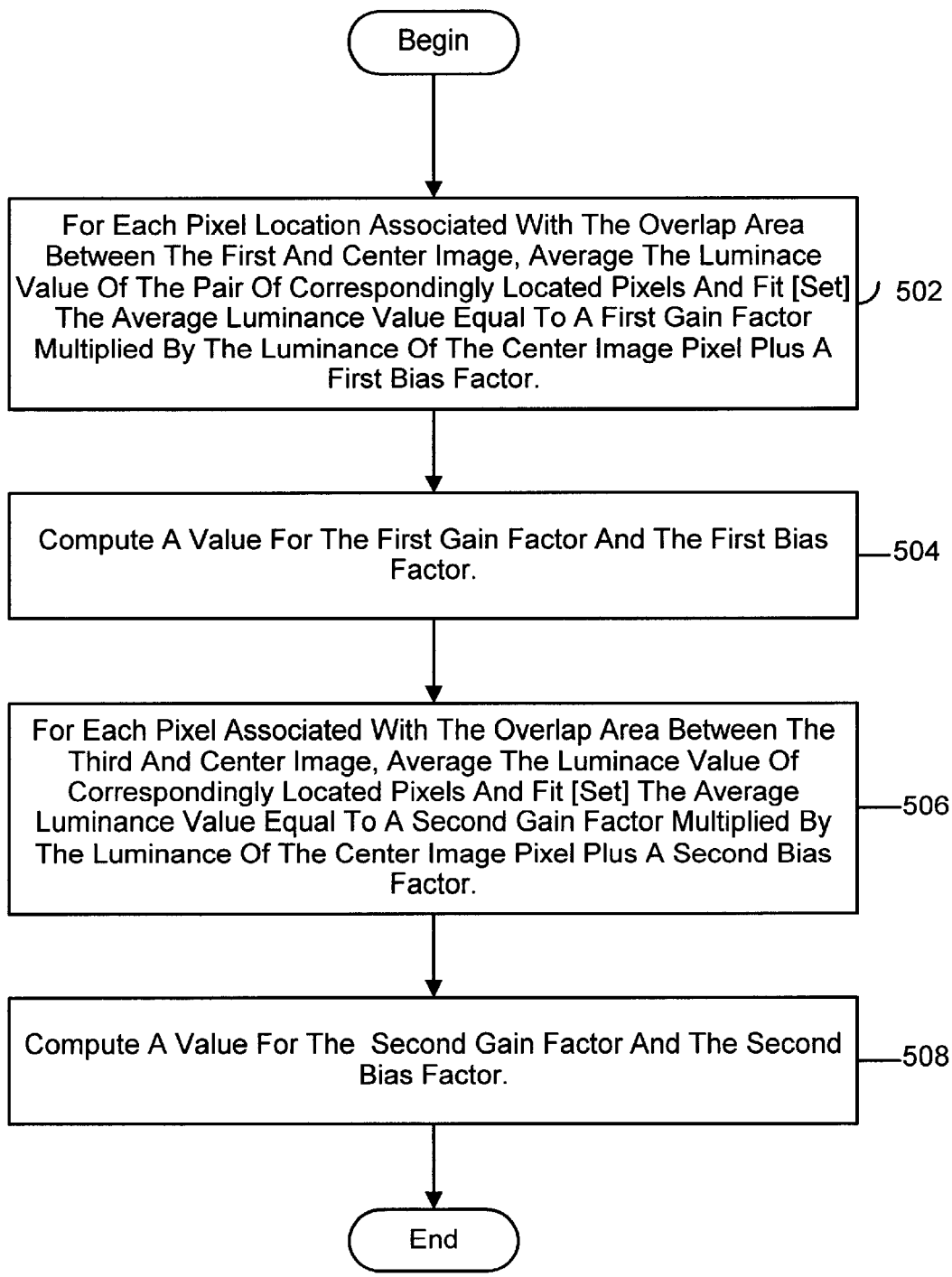
FIG. 3 depicts a flow diagram of a method for determining exposure correction factors.

The aforementioned procedure for calculating the exposure correction factors will now be described in reference to FIG. 3. To calculate the exposure correction factors associated with the first and center images, for each pixel location associated with the overlap area between the first and the center image, the average luminance value of each pair of correspondingly located pixels is calculated. The average luminance of each pair of correspondingly located pixels is then fit to the product of a first gain factor, multiplied by the luminance of the center image pixel of the pair added to a first bias factor to form a series of equations (process action 502). A value for the first gain factor and the first bias factor is then calculated (process action 504), preferably using a least squares fit approach.

To calculate the exposure correction factors associated with the center and third images, for each pixel location associated with the overlap area between the third and center image, the average luminance values of each pair of correspondingly located pixels is calculated (process action 506). These average luminance values are respectively fit to the product of a second gain factor multiplied by the luminance of the center image pixel of the pair, added to a second bias factor. A value for the second gain factor and the second bias factor is then calculated (process action 508), again preferably using a least squares fit approach.

The aforementioned procedure for applying the calculated exposure correction factors to the center image, will now be described in reference to FIG. 4. For each column of pixels, assuming the triplet of images are lined up horizontally, separate gain and bias factors are calculated by linearly ramping from the first gain factor to the second gain factor and from the first bias factor to the second bias factor (process action 602). Thus, there is a unique bias and gain factor assigned to each column or row. As indicated by process action 604, the luminance of each pixel of a column is multiplied by the gain factor associated with that column. This resulting product is added to the bias factor associated with that column to compute an adjusted luminance for the pixel under consideration. The adjusted luminance computed for each pixel is then assigned to that pixel to arrive at the corrected exposure, as shown in process action 606.

For triplets of images that are aligned vertically, a similar process can be used to apply the exposure correction factor to the center image, except that it may be performed on a row by row basis rather than column by column. Specifically, referring to FIG. 5, for each row of pixels in the center image separate gain and bias factors are calculated by linearly ramping from the first gain factor to the second gain factor and from the first bias factor to the second bias factor (process action 602'). As indicated by process action 604', the luminance of each pixel of a row is multiplied by the gain factor associated with that row. This resulting product is added to the bias factor associated with that row to compute an adjusted luminance for the pixel under consideration. The adjusted luminance computed for each pixel is then assigned to that pixel to arrive at the corrected exposure, as shown in process action 606'.

It is noted that while a column-by-column method was described for horizontally aligned images, this need not be the case. Rather than applying the gain and bias factors computed for a column to each pixel of the column and then moving on to the next column, the procedure could be done on a row by row basis. In this, variation a row of the center image is selected and for each pixel in the selected row, the gain and bias factors associated with the column that the pixel under consideration belongs to is applied. This is then repeated for each row of the center image.

Similarly, vertically aligned images could be processed using a column-by-column approach rather than the row-by-row method described above. Specifically, a column of the center image is selected and for each pixel in the selected column, the gain and bias factors associated with the row that the pixel under consideration belongs to is applied. This is repeated for each row of the center image.

Furthermore, the system and process according to the present invention could be adapted to a full 2D context rather than just pure horizontal or vertical overlapped images. In other words, the present exposure compensation approach could be extended to mosaiced images where a particular component image could have adjacent overlapping images in any 2D direction. There could even be more than just two adjacent images involved. For mosaiced images in which multiple frames overlap, gain and bias values would be fit to the average luminances of the corresponding pixels in the overlap regions just as with purely horizontal or vertical overlapping image scenarios. However, these values would then be fit to a smoothly varying function to compute the gain and bias in other regions of the compensated image. The values could be fit to a plane. In this case the gain and bias values vary in two dimensions. Other smooth interpolation schemes, such as splines, could also be used.

The general method of exposure compensation having been described, we will now further illustrate this process with an example. In this example three images are stitched together horizontally and a column-by-column approach is employed.

Figure 6:
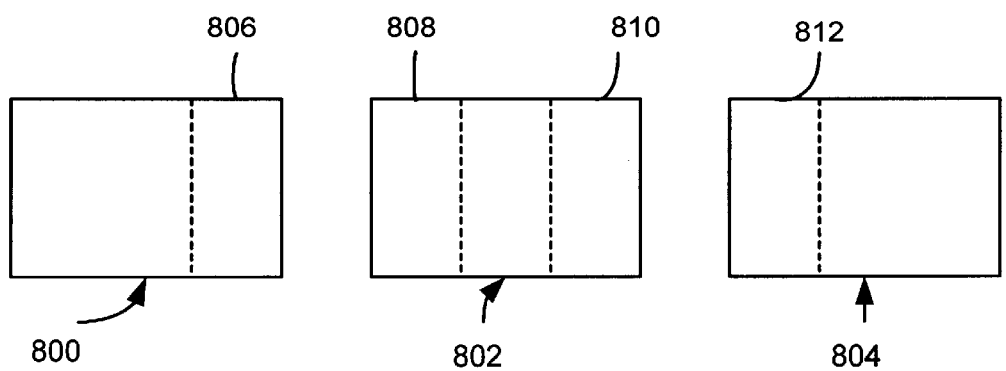
FIG. 6 depicts a triplet of mosaiced images.
Figure 7:
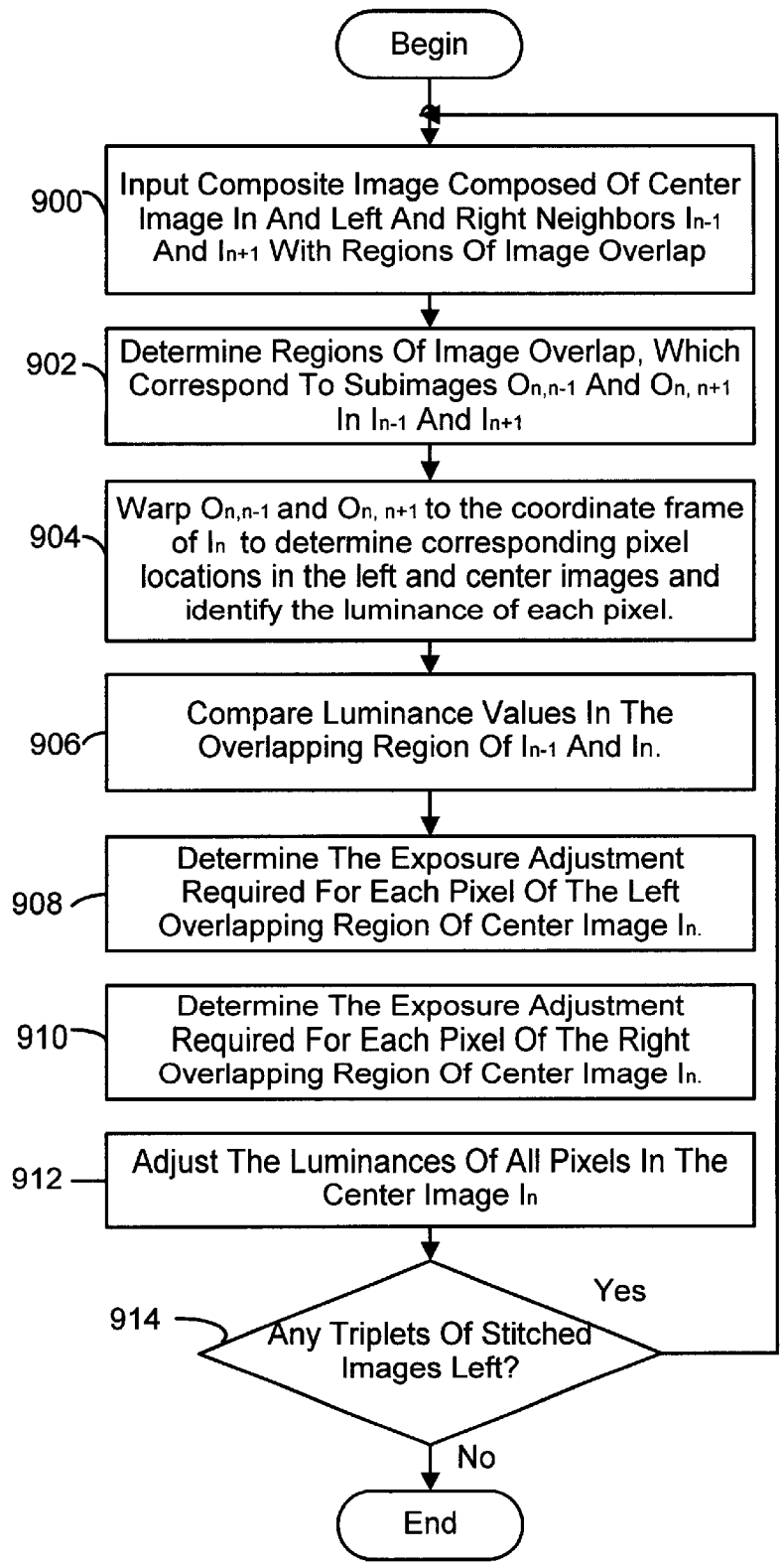
FIG. 7 depicts a flow diagram of the exposure adjusting method of FIG. 4 as applied to an exemplary triplet of images that have been aligned horizontally and stitched.

As shown in FIG. 6, given a center image $I_n$, 802, and its left and right neighbors, $I_{n-1}$ and $I_{n+1}$, 800 and 804, respectively, the regions of overlap in image $I_n$ are the sub-images $O_{n,n-1}$ (808) and $O_{n,n+1}$ (810). These correspond to sub-images $O_{n-1,n}$ (806) and $O_{n+1,n}$ (812) in images $I_{n-1}$ (800) and $I_{n+1}$ (804), respectively. As shown in FIG. 7, this set of images $I_n$, $I_{n-1}$, and $I_{n+1}$, forming the composite image, is input into the system and method according to the present invention (process action 900) and the areas of overlap are determined (process action 902).

The sub-images $O_{n-1,n}$ and $O_{n+1,n}$ are warped to the coordinate frame of $I_n$ to determine the corresponding pixel locations in the center ($I_n$) images and adjacent images. Additionally, the luminance of each pixel is computed. (See process action 904). The luminance values of corresponding pixels in the overlapping region of $I_{n-1}(O_{n-1,n})$ and $I_n$ ($O_{n,n-1}$) are then compared, as shown in process action 906. The exposure adjustment required is determined for each pixel of the left overlapping region of the center image (In), as shown in process action 908. This is accomplished by averaging the luminance values of the corresponding pixels and fitting this value to a gain factor, $\alpha_{n,n-1}$, multiplied by the luminance of the center image pixel, $y_n$, added to a bias factor, $\beta_{n,n-1}$, or:

$$(y_n + y_{n-1})/2 = \alpha_{n,n-1} \cdot y_n + \beta_{n,n-1}$$

This is done for every pixel in the left hand overlapping region of the center image. Then these equations are solved for the gain and the bias of the left image ($\alpha_{n,n-1}$ and $\beta_{n,n-1}$) by preferably using a least squares fit approach. The same process is then repeated for the right hand overlapping region of the center image to determine $\alpha_{n,n+1}$ and $\beta_{n,n+1}$ (process action 910). Using this equation, $$(y_n + y_{n+1})/2 = \alpha_{n,n+1} \cdot y_n + \beta_{n,n+1}$$

The result of these calculations are two gain and bias sets $\alpha_{n,n-1}$, $\beta_{n,n-1}$ and $\alpha_{n,n+1}$, $\beta_{n,n+1}$.

As shown in process action 912, to adjust the exposure in the stitched center image, every pixel in every pixel column (starting on the left side) is selected and its luminance value is multiplied by an appropriate $\alpha$ and $\beta$ value. The luminance value of each pixel of the first (leftmost) column is multiplied by $\alpha_{n,n-1}$ and this product is added to $\beta_{n,n-1}$ i.e., $$(y_{new} = \alpha_{n,n-1} \cdot y_n + \beta_{n,n-1})$$

The luminance of each pixel of each subsequent pixel column (going from left to right) is adjusted using the same process, with the exception of employing an $\alpha$ and $\beta$ value modified using a linear ramping function. The modified $\alpha$ and $\beta$ values for each pixel column (moving from left to right) are determined by adding a fixed $\alpha$ and $\beta$ increment value to the $\alpha$ and $\beta$ values used in the previous pixel column. The $\alpha$ and $\beta$ increment values used are calculated by the equations:

$$(\alpha_{n,n-1} - \alpha_{n,n-1})/\text{number of pixel columns} = \alpha_{increment(left)}; \text{ and}$$

$$(\beta_{n,n+1} - \beta_{n,n-1})/\text{number of pixel columns} = \beta_{increment(left)}.$$

It is noted that the $\alpha$ and $\beta$ values that will be used to adjust the luminances of the pixels in the rightmost column will turn out to be $\alpha_{n,n+1}$, $\beta_{n,n+1}$ using the foregoing method.

It is also noted that luminance values of the pixel columns could also be corrected by starting at the far rightmost pixel column and moving towards the left by starting with $\alpha_{n,n+1}$-$\beta_{n,n+1}$ and employing a $\alpha$ and $\beta$ increment computed as $$(\alpha_{n,n-1} - \alpha_{n,n+1})/\text{number of pixel columns} = \alpha_{increment(right)}; \text{ and}$$

$$(\beta_{n,n-1} - \beta_{n,n+1})/\text{number of pixel columns} = \beta_{increment(right)}.$$

The above process of finding the overlapping regions in a triplet of stitched images, calculating the required exposure correction factors and then adjusting the luminances of all pixels in the center image, is then repeated for all image triplets of the stitched image (i.e., sets of left, center and right input images used to make up the mosaiced image).

As described previously, the transitions between overlapping and non-overlapping portions of the mosaiced image could be blended using a feathering process to further smooth the overall exposure of the image.

Figure 8A:
FIG. 8A depicts a triplet of images before being input into the system and method according to the present invention.
Figure 8B:
FIG. 8B depicts a triplet of images after being input into the system and method according to the present invention.

An example of the improvement in the exposure that the present system and method can provide is illustrated in FIGS. 8A and 8B. FIG. 8A depicts a triplet of images before being input into the system and method according to the present invention. FIG. 8B depicts a triplet of images afterwards.

While the invention has been described in detail by specific reference to preferred embodiments thereof, it is understood that variations and modifications thereof may be made without departing from the true spirit and scope of the invention.

What is claimed is:

1. A computer-implemented process for improving the uniformity in exposure in a composite image formed from at least a triplet of overlapping images, said process comprising using a computer to perform the following process actions, for each triplet of said images:
    locating the areas of overlap between a first, center and third image;
    warping the areas of overlap associated with the first and third images to the coordinate frame of the center image;
    identifying the corresponding pixels in overlapping image areas and their luminance values;
    computing at least one exposure adjustment parameter for each overlapping area based on the differences between the luminances of each correspondingly located pixel in the overlap area; and
    adjusting the luminance for every pixel in the center image based on the at least one exposure adjustment parameter associated with each overlap area.

2. The process of claim 1, wherein the process action of computing at least one exposure adjustment parameter for each overlapping area, comprises the actions of:
    for each pixel location associated with the overlap area between the first and center image, averaging the luminance values of correspondingly located pixels and setting the average luminance value equal to the product of a first gain factor multiplied by the luminance of the center image pixel plus a first bias factor, thereby creating a first series of equations;
    computing a value for said first gain factor and said first bias factor from said first series of equations;
    for each pixel location associated with the overlap area between the third and center image, averaging the luminance values of correspondingly located pixels and setting the average luminance value equal to the product of a second gain factor multiplied by the luminance of the center image pixel plus a second bias factor, thereby creating a second series of equations; and
    computing a value for said second gain factor and said second bias factor from said second series of equations.

3. The process of claim 2, wherein the process action of computing a value for said first gain factor and said first bias factor from said first series of equations, comprises the action of employing a least squares approach to compute said first gain and bias values.

4. The process of claim 2, wherein the process action of computing a value for said second gain factor and said second bias factor from said first series of equations, comprises the action of employing a least squares approach to compute said second gain and bias values.

5. The process of claim 1, wherein the process action of adjusting the luminance for every pixel in the center image, comprises the actions of:
- for each column of pixels in the center image if the triplet of images are lined up horizontally, and for each row of pixels in the center image if the triplet of images are lined up vertically,
  - computing separate gain and bias factors by linearly ramping from the first gain factor to the second gain factor and from the first bias factor to the second bias factor,
  - multiplying the luminance of each pixel of said column or row by the gain factor associated with that column or row, and adding the resulting product to the bias factor associated with the column or row, to compute an adjusted luminance for the pixel under consideration,
  - assigning the adjusted luminance computed for each pixel to that pixel.

6. The process of claim 1, further comprising the process action of blending the transitions between overlapping and non-overlapping input image regions.

7. The process of claim 6, wherein the process action of blending the transitions between overlapping and non-overlapping input image regions further comprises the process action of weighting proportionally to its distance to the edge of the overlapping region the luminance value of each pixel.

8. The process of claim 1, wherein more than one triplet of images from a stitched image is processed to correct the exposure of an entire stitched image and wherein a third input image of a given triplet is processed as the first input image of another consecutive triplet.

9. A system for generating a composite image, formed from at least a triplet of overlapping images, that exhibits an improved uniformity in exposure, the system comprising:
- a general purpose computing device;
- a computer program comprising program modules executable by the computing device, wherein the computing device is directed by the program modules of the computer program to,
  - for each triplet of images in the composite image,
    - locate the areas of overlap between a first, center and third image;
    - warp the areas of overlap associated with the first and third images to the coordinate frame of the center image;
    - compute a gain factor and a bias factor for each overlapping area based on the differences between the luminances of each correspondingly located pixel in the overlap area; and
    - adjust the luminance for every pixel in the center image based on the gain and bias factors associated with each overlap area.

10. The system of claim 9, wherein the program module for computing the gain and bias factors for each overlapping area, comprises sub-modules for:
- for each pixel location associated with the overlap area between the first and center image, averaging the luminance values of correspondingly located pixels associated with the pixel location under consideration and setting the average luminance value equal to the product of a first gain factor multiplied by the luminance of the center image pixel associated with the pixel location plus a first bias factor, thereby creating a first series of equations;
- computing a value for said first gain factor and said first bias factor from said first series of equations using a least squares approach;
- for each pixel location associated with the overlap area between the third and center image, averaging the luminance values of correspondingly located pixels associated with the pixel location under consideration and setting the average luminance value equal to the product of a second gain factor multiplied by the luminance of the center image pixel plus a second bias factor, thereby creating a second series of equations; and
- computing a value for said second gain factor and said second bias factor from said second series of equations using a least squares approach.

11. The system of claim 9, wherein the program module for adjusting the luminance for every pixel in the center image, comprises sub-modules for:
- for each column of pixels in the center image if the triplet of images are lined up horizontally,
  - computing separate gain and bias factors by linearly ramping from the first gain factor to the second gain factor and from the first bias factor to the second bias factor,
  - multiplying the luminance of each pixel of said column by the gain factor associated with that column, and adding the resulting product to the bias factor associated with the column, to compute an adjusted luminance for the pixel under consideration, and
  - assigning the adjusted luminance computed for each pixel to that pixel.

12. The system of claim 9, wherein the program module for adjusting the luminance for every pixel in the center image, comprises sub-modules for:
- for each row of pixels in the center image if the triplet of images are lined up vertically,
  - computing separate gain and bias factors by linearly ramping from the first gain factor to the second gain factor and from the first bias factor to the second bias factor,
  - multiplying the luminance of each pixel of said row by the gain factor associated with that row, and adding the resulting product to the bias factor associated with the row, to compute an adjusted luminance for the pixel under consideration, and
  - assigning the adjusted luminance computed for each pixel to that pixel.

13. The system of claim 9, further comprising a program module to feather the transitions between overlapping and non-overlapping input image regions.

14. A computer-readable medium having computer-executable instructions for improving the uniformity in exposure in a composite image formed from at least a triplet of overlapping images, said computer-executable instructions comprising:
- for each triplet of images in the composite image,
  - locating the areas of overlap between a first, center and third image;
  - warping the areas of overlap associated with the first and third images to the coordinate frame of the center image;

computing at least one exposure adjustment parameter for each overlapping area based on the differences between the luminances of each correspondingly located pixel in the overlap area; and adjusting the luminance for every pixel in the center image based on the at least one exposure adjustment parameter associated with each overlap area.

15. The computer-readable medium of claim 14 wherein the instructions for computing at least one exposure adjustment parameter for each overlapping area, comprises sub-modules to:

for each pixel location associated with the overlap area between the first and center image, average the luminance values of correspondingly located pixels and set the average luminance value equal to the product of a first gain factor multiplied by the luminance of the center image pixel plus a first bias factor, to thereby create a first series of equations;

compute a value for said first gain factor and said first bias factor from said first series of equations;

for each pixel location associated with the overlap area between the third and center image, average the luminance values of correspondingly located pixels and set the average luminance value equal to the product of a second gain factor multiplied by the luminance of the center image pixel plus a second bias factor, to thereby create a second series of equations; and compute a value for said second gain factor and said second bias factor from said second series of equations.

16. The computer-readable medium of claim 14 wherein the instructions for computing a value for said first gain factor and said first bias factor from said first series of equations, comprises a sub-module for employing a least squares approach to compute said first gain and bias values.

17. The computer-readable medium of claim 14, wherein the instructions for adjusting the luminance for every pixel in the center image, comprises sub-modules to:

for each row of pixels in the center image of a triplet of images that are composited horizontally,
compute individual gain and bias factors for each column of the center image by linearly ramping from the first gain factor to the second gain factor and from the first bias factor to the second bias factor,
respectively multiply the luminance of each pixel of the row under consideration by the gain factor associated with the column to which the pixel belongs, and add the resulting product to the bias factor associated with the column to which the pixel belongs, to compute an adjusted luminance for each pixel of the row under consideration; and
assign the adjusted luminance computer for each pixel to that pixel.

18. The computer-readable medium of claim 14, wherein the instructions for adjusting the luminance for every pixel in the center image, comprises sub-modules to:

for each column of pixels in the center image of a triplet of images that are composited vertically,
compute individual gain and bias factors for each row of the center image by linearly ramping from the first gain factor to the second gain factor and from the first bias factor to the second bias factor,
respectively multiply the luminance of each pixel of the column under consideration by the gain factor associated with the row to which the pixel belongs, and add the resulting product to the bias factor associated with the row to which the pixel belongs, to compute an adjusted luminance for each pixel of the column under consideration; and
assign the adjusted luminance computer for each pixel to that pixel.

19. A system for generating a panoramic video of a surrounding scene comprising:

a camera rig comprising multiple video cameras disposed so as to view different portions of the scene, but wherein the field of view of each camera overlaps that of each adjacent camera;

a computer program comprising program modules executable by the computing device, wherein the computing device is directed by the program modules of the computer program to,
input multiple videos of the scene, wherein each was captured using a separate one of the cameras of the camera rig,
stitching together individual frames of the inputted videos which were captured at approximately the same moment in time to form each panoramic frame of the panoramic video;
for each triplet of images used to form the panoramic frame,
locate the areas of overlap between a first, center and third image;
warp the areas of overlap associated with the first and third images to the coordinate frame of the center image;
identify the corresponding pixels in overlapping image areas and their luminance values;
compute at least one exposure adjustment parameter for each overlapping area based on the differences between the luminances of each correspondingly located pixel in the overlap area; and
adjust the luminance for every pixel in the center image based on the at least one exposure adjustment parameter associated with each overlap area.

* * * * *

UNITED STATES PATENT AND TRADEMARK OFFICE
CERTIFICATE OF CORRECTION

| | | |
|---|---|---|
| PATENT NO. | : 6,813,391 B1 | Page 1 of 2 |
| APPLICATION NO. | : 09/611645 | |
| DATED | : November 2, 2004 | |
| INVENTOR(S) | : Uyttendaele et al. | |

Figure 4:
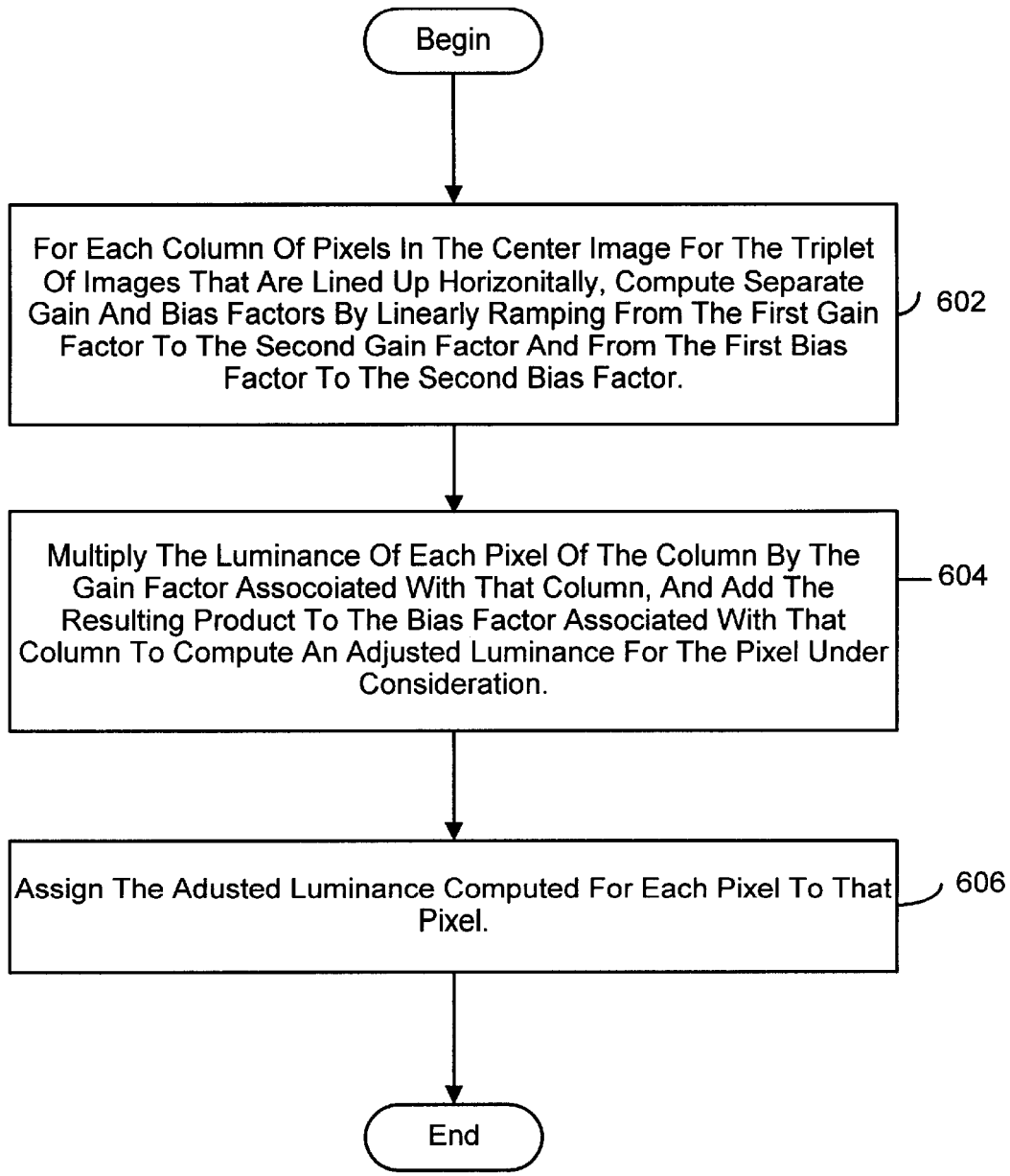
FIG. 4 depicts a flow diagram of a method of applying exposure correction factors to a stitched image that has been stitched together after aligning the images horizontally.

It is certified that error appears in the above-identified patent and that said Letters Patent is hereby corrected as shown below:

On Sheet 4 of 8, in FIG. 4 (reference numeral 604), line 2, delete "Assocoiated" and insert -- Associated --, therefor.

On Sheet 4 of 8, in FIG. 4 (reference numeral 606), line 1, delete "Adusted" and insert -- Adjusted --, therefor.

Figure 5:
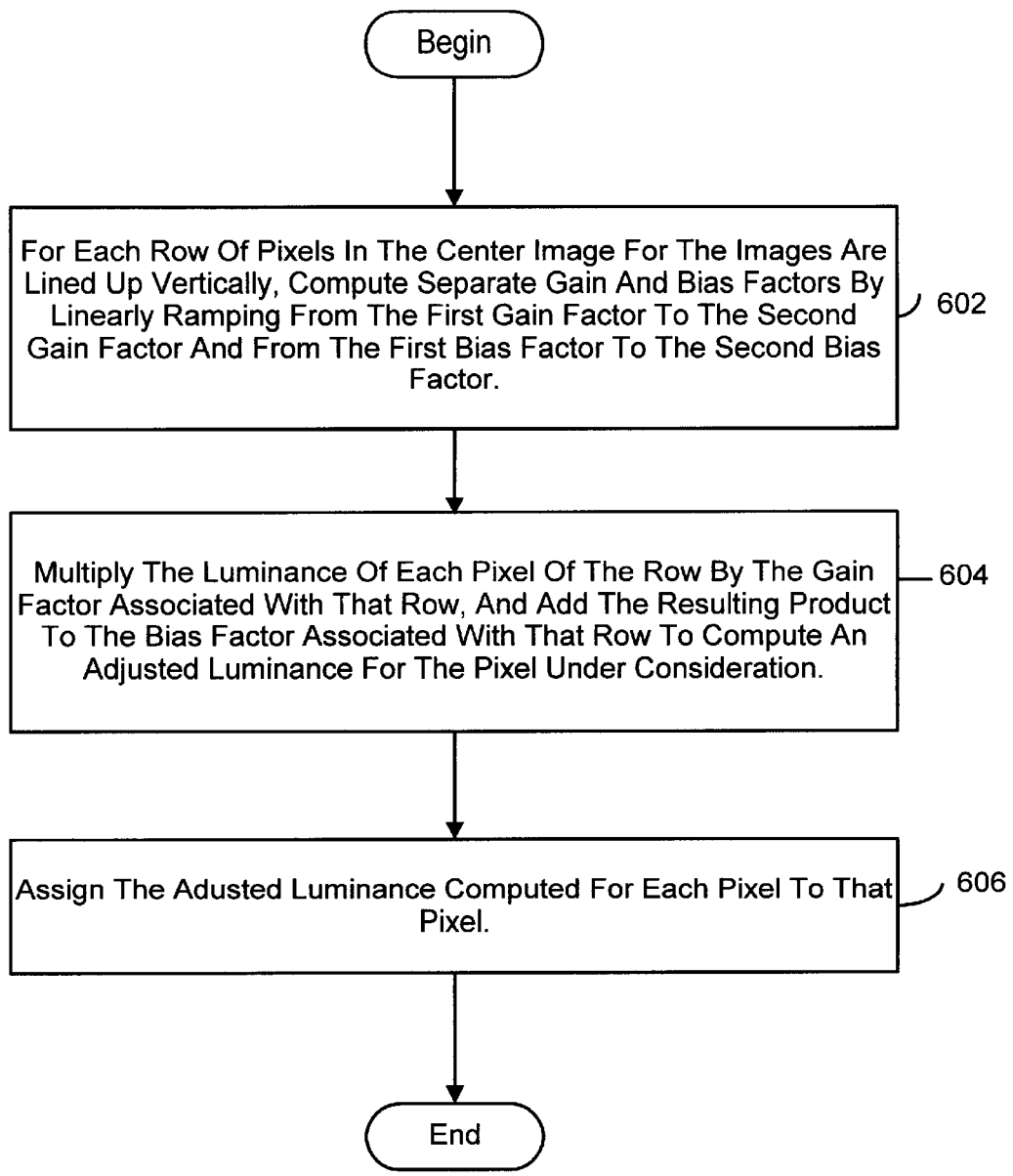
FIG. 5 depicts a flow diagram of a method of applying exposure correction factors to a stitched image that has been stitched together after aligning up the images vertically.

On Sheet 5 of 8, in FIG. 5 (reference numeral 606), line 1, delete "Adusted" and insert -- Adjusted --, therefor.

In column 4, line 53, after "accessed by" delete "110".

In column 8, line 31, after "this" delete ",".

In column 9, line 5, after "$I_{n-1}$" delete ",".

In column 9, line 34, after "$\beta_{n,n+1}$" insert -- . --.

In column 9, line 36, after "$\beta_{n,n-1}$" insert -- ; --.

In column 9, line 42, after "$\beta_{n,n-1}$" insert -- , --.

In column 9, line 44, before "ynew" delete "(".

In column 9, line 55, delete "$(\alpha_{n,n=1}$" and insert -- $(\alpha_{n,n+1}$ --, therefor.

UNITED STATES PATENT AND TRADEMARK OFFICE
CERTIFICATE OF CORRECTION

PATENT NO. : 6,813,391 B1
APPLICATION NO. : 09/611645
DATED : November 2, 2004
INVENTOR(S) : Uyttendaele et al.

It is certified that error appears in the above-identified patent and that said Letters Patent is hereby corrected as shown below:

In column 9, line 55, delete "$\alpha_{increment(left)}$;" and insert -- $\alpha_{increment(left)}$; --, therefor.

In column 9, line 63, after "$\alpha_{n,n+1}$" delete "–" and insert -- , --, therefor.

In column 9, line 67, after "$\beta_{increment(right)}$" delete ";" and insert -- . --, therefor.

Signed and Sealed this

Fifteenth Day of September, 2009

David J. Kappos
*Director of the United States Patent and Trademark Office*